A. A. NORTH.
CHUCK.
APPLICATION FILED JUNE 6, 1907.

932,996.

Patented Aug. 31, 1909.

2 SHEETS—SHEET 1.

Witnesses.

Inventor.
Albert A. North

A. A. NORTH.
CHUCK.
APPLICATION FILED JUNE 6, 1907.

932,996.

Patented Aug. 31, 1909.
2 SHEETS—SHEET 2.

Witnesses.
L. E. Burkovitch.
D. Kinnendahl.

Inventor.
Albert A. North

UNITED STATES PATENT OFFICE.

ALBERT A. NORTH, OF NEW BRITAIN, CONNECTICUT, ASSIGNOR TO THE SKINNER CHUCK COMPANY, OF NEW BRITAIN, CONNECTICUT, A CORPORATION OF CONNECTICUT.

CHUCK.

932,996.  Specification of Letters Patent.  Patented Aug. 31, 1909.

Application filed June 6, 1907.  Serial No. 377,543.

*To all whom it may concern:*

Be it known that I, ALBERT A. NORTH, citizen of the United States of America, residing at New Britain, in the county of Hartford and State of Connecticut, have invented certain new and useful Improvements in Chucks, of which the following is a specification.

My invention relates to the class of lathe chucks, and more especially to the devices included in such class known as independent chucks, or one in which the jaws are operated independently each of the other.

The object of my invention is to provide a construction of chuck in which the feed-screw shall not be inadvertently dislodged; and a further object of the invention is to provide a construction for retaining the feed-screw in its bearing that shall be simple in construction and efficient in its method of operation.

A form of device in the use of which these objects may be attained is illustrated in the accompanying drawings in which—

Figure 1:
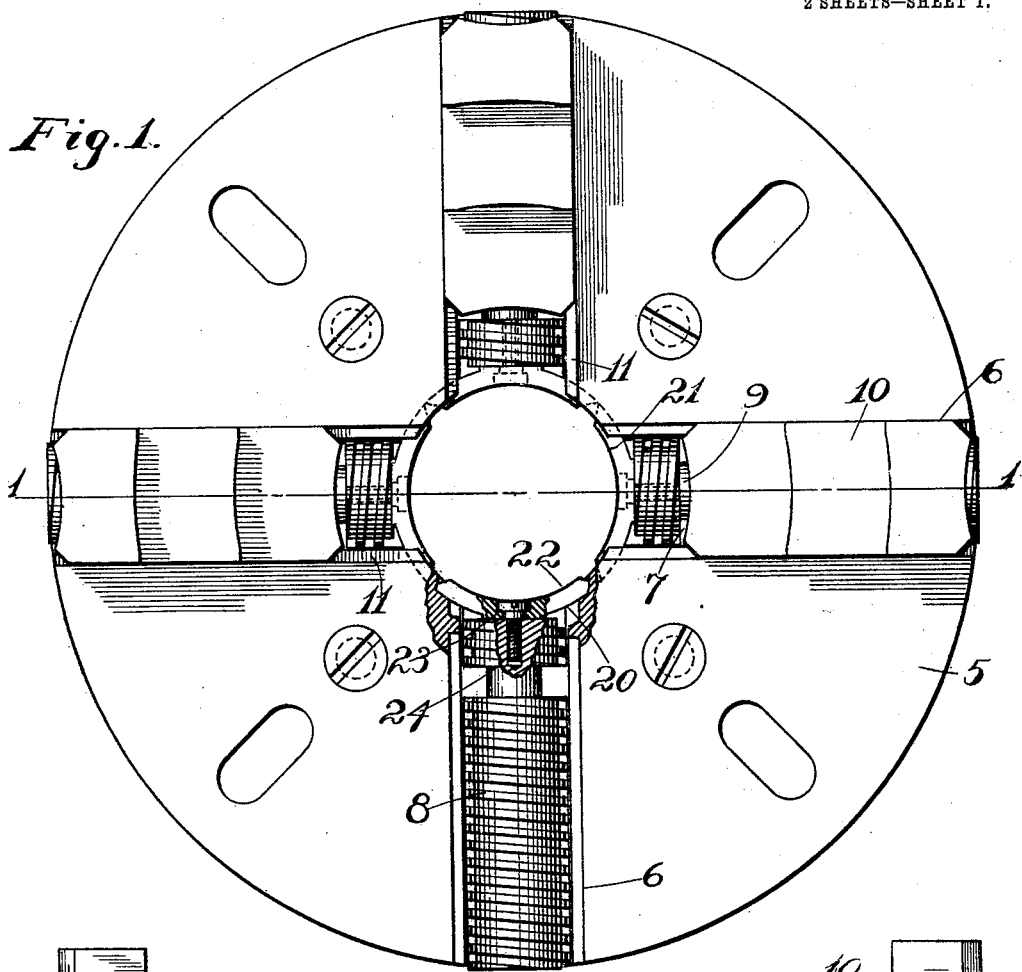
Figure 2:
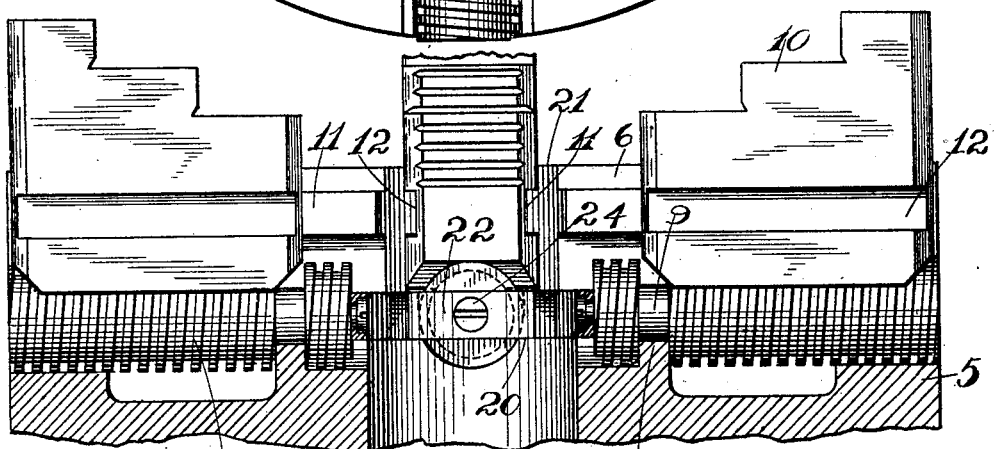
Figure 3:
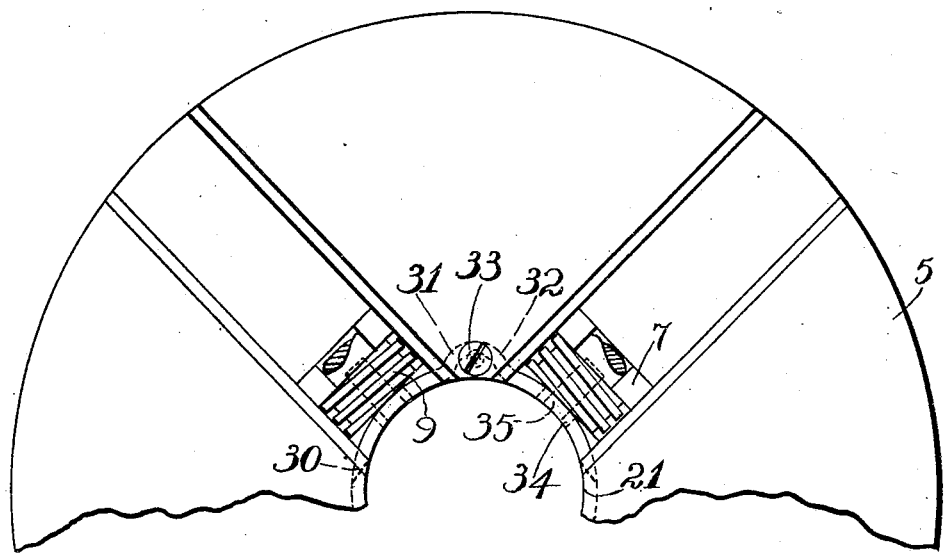
Figure 4:
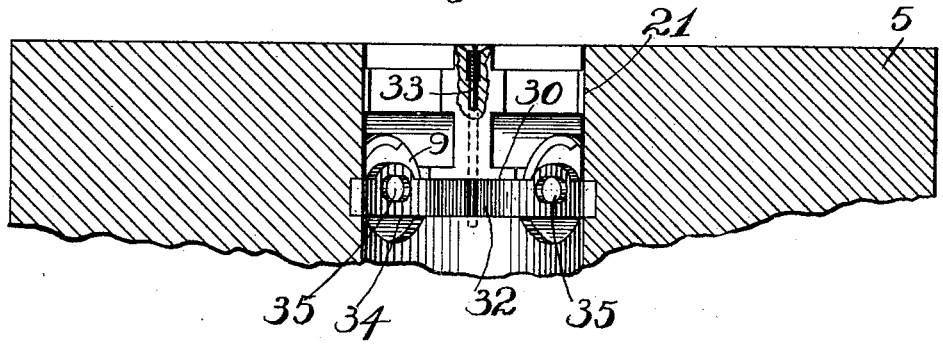

Figure 1 is a face view of a lathe chuck embodying my invention with parts broken away to show construction. Fig. 2 is a view in section through the chuck on the line 1—1. Fig. 3 is a face view of a portion of a chuck illustrating another form of the invention, parts being broken away to show construction. Fig. 4 is a view in section through the chuck looking toward the retainer.

In the accompanying drawings the numeral 5 denotes a chuck body having radial grooves 6. This body, in the usual form of construction, is made of metal cast to shape. A bearing 7 is formed integral with the body of the chuck extending across the groove 6 and in this bearing a feed-screw 8 is supported. The feed-screw is cut away to provide a neck 9 forming the bearing thereof.

Chuck jaws 10 are located in the grooves 6. Ribs 11 oppositely arranged on the walls of the grooves enter slots 12 in the chuck jaws and form a means for holding the parts in engagement while allowing the jaws a longitudinal reciprocation within the grooves. The under side of the jaws are threaded to fit the threads on the feed-screws and the latter being held against lengthwise movement by the peculiar formation of the bearing, as a feed-screw is turned the nut on a jaw appurtenant thereto causes the jaw to be moved radially of the chuck body.

The form of construction just described is old and well known, and the chuck body is also provided with other parts incidental to its operation, the construction and operation of which are well known, and for this reason further and detailed description thereof is omitted.

In order to obtain a sufficient extent of engaging surface between the feed-screw and a chuck jaw the bearing 7 and neck 9 are comparatively short. This construction however results in a lifting of the feed-screw from its bearing when the chuck jaw is located at a distance from the bearing and is turned in a certain direction. In replacing the feed-screw the corners of the cast-iron bearing 7 are liable to be chipped and broken, thus injuring and in many cases destroying such bearing, which, however, but for such defect, is the desirable form of construction owing to its cheapness. In cases of such injury it is necessary to drill out the bearing and insert a separate piece which must then be cut to form a bearing. It therefore becomes essential that this lifting of the feed-screw from its bearing shall be prevented and the means herein shown effectually accomplishes this result by the employment of a construction which at the same time involves a minimum cost. In carrying out this idea I provide a retainer groove 20 extending circumferentially about the wall of the central opening 21 through the chuck body. This groove is of a width to receive and hold a retainer 22 which is curved on the arc of the circle constituting the opening 21. A hole 23 is formed through the retainer and this hole is counterbored for the reception of the head of a retaining-screw 24. This retaining-screw is threaded into an opening in the end of the feed-screw 8, the retaining-screw seating against the end of the feed-screw as plainly shown in Fig. 1 of the drawings.

In the form of the device illustrated in Figs. 3 and 4 instead of employing a single retainer for each feed-screw a retainer for holding a plural number of feed-screws is shown. In this form of the device the groove 30 is recessed as at 31. The retainer is formed on the arc of a circle corresponding with the central opening 21 but has a depressed or offset portion 32 fitting within the recess 31. A retaining screw 33 is passed into the chuck to hold the retainer in place, preferably engaging with this offset portion 32 thus holding the retainer securely within the groove 30. Slots 34 are formed in the retainers, these slots being adapted to receive pins 35 which are formed as part of or secured within the feed-screw 8. This method of retaining the feed-screws in place is much the same as that first above described, and in both instances it will be seen that while the bearing 7 may be constructed integral with the chuck body, yet at the same time the feed-screw is effectually retained in position.

I contemplate as within the scope of the invention other means of holding the feed-screw in place within a bearing integrally formed with the chuck body, but for the purposes of this application I have deemed the forms herein described as being sufficient.

What I claim as my invention and desire to secure by Letters Patent is:—

1. A chuck body having a radially formed groove and a central opening with a retainer groove, a jaw slidable in said groove, a feed-screw located within the groove and operatively engaging the jaw, a feed-screw bearing integrally formed with the chuck body, a retainer located within the retainer groove, and means from said retainer engaging the feed-screw to hold it in its bearing.

2. A chuck body having a radially formed groove and a central opening having a retainer groove, a chuck jaw slidable in said groove, a feed-screw located within the groove and operatively engaging said chuck jaw, a feed-screw bearing integrally formed in the chuck body, a retainer removably secured within said retainer groove, and a screw loosely mounted in the retainer and secured within the end of said feed-screw.

In testimony whereof I affix my signature in presence of two witnesses.

ALBERT A. NORTH.

Witnesses:
BENJ. F. DAMON,
E. J. SKINNER.